US010345839B1

(12) United States Patent
Ogura

(10) Patent No.: US 10,345,839 B1
(45) Date of Patent: Jul. 9, 2019

(54) VOLTAGE REGULATOR

(71) Applicants: Kabushiki Kaisha Toshiba, Minato-ku, Tokyo (JP); Toshiba Electronic Devices & Storage Corporation, Minato-ku, Tokyo (JP)

(72) Inventor: Akio Ogura, Yokohama Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/125,810

(22) Filed: Sep. 10, 2018

(30) Foreign Application Priority Data

Mar. 19, 2018 (JP) ................................ 2018-051637

(51) Int. Cl.
*H02M 3/156* (2006.01)
*G05F 1/575* (2006.01)

(52) U.S. Cl.
CPC .................................... *G05F 1/575* (2013.01)

(58) Field of Classification Search
CPC ..... G05F 1/10; G05F 1/46; G05F 1/56; G05F 1/575; G05F 3/135; G05F 3/145; G05F 3/155; G05F 3/156; G05F 3/157; H05M 3/155; H02M 1/156; H02M 3/158; H02M 3/1588
See application file for complete search history.

(56) References Cited

U.S. PATENT DOCUMENTS 5,783,934 A * 7/1998 Tran ........................ G05F 3/242 323/312
5,889,393 A 3/1999 Wrathall
6,304,131 B1 10/2001 Huggins et al.
2012/0098508 A1* 4/2012 Zhu ........................... G05F 1/56 323/272
2012/0223688 A1* 9/2012 Iriarte ....................... G05F 1/56 323/280
2016/0147239 A1* 5/2016 Yan ......................... G05F 1/575 323/280
2016/0308497 A1* 10/2016 Park .......................... H03F 1/26
2017/0205840 A1 7/2017 Ogura
2017/0220059 A1* 8/2017 Kadowaki ............... G05F 1/575

(Continued)

FOREIGN PATENT DOCUMENTS

JP S62-198208 A 9/1987
JP 5-035344 B2 2/1993
JP 2000-284843 A 10/2000

(Continued)

*Primary Examiner* — Adolf D Berhane
(74) *Attorney, Agent, or Firm* — White & Case LLP

(57) ABSTRACT

A voltage regulator has feedback circuitry to generate a feedback voltage relative to an output voltage, and an amplifier to amplify a differential voltage between the feedback voltage and a reference voltage to generate the output voltage. The amplifier has a first transistor to feed a current in accordance with the feedback voltage, and a second transistor to feed a current in accordance with the reference voltage. The first transistor has a first gate to be applied with the feedback voltage, and the second transistor has a second gate to be applied with the reference voltage, and the voltage regulator further comprising a conductor disposed to face at least either one of the first and second gates, the conductor being set at a predetermined electric potential.

11 Claims, 7 Drawing Sheets

(56) References Cited

U.S. PATENT DOCUMENTS

| | | | | |
|---|---|---|---|---|
| 2018/0173260 | A1* | 6/2018 | Zou | G05F 1/575 |
| 2018/0267480 | A1* | 9/2018 | Mahajan | G04F 10/005 |

FOREIGN PATENT DOCUMENTS

| | | | |
|---|---|---|---|
| JP | 2000-357692 | A | 12/2000 |
| JP | 2001-195138 | A | 7/2001 |
| JP | 2002-182758 | A | 6/2002 |
| JP | 5-018290 | B2 | 9/2012 |
| JP | 2017-126259 | A | 7/2017 |

* cited by examiner

VOLTAGE REGULATOR

CROSS REFERENCE TO RELATED APPLICATIONS

This application is based upon and claims the benefit of priority from the prior Japanese Patent Application No. 2018-51637, filed on Mar. 19, 2018, the entire contents of which are incorporated herein by reference.

FIELD

Embodiments of the present disclosure relate to a voltage regulator.

BACKGROUND

Various types of electronic appliances include many devices such as a microcomputer, a sensor, and a driver. Since, the respective devices may not always have the same power-supply voltage level to be required, it is necessary to generate an optimum power-supply voltage by a linear regulator.

When the output voltage of the linear-regulator varies due to the effect of a power supply noise, each device operates unstably. A power-supply noise rejection ratio (PSRR: Power Supply Rejection Ratio) is an indicator to indicate the degree of effect of power supply noise to the linear regulator output. The PSRR is expressed with a ratio of power-supply voltage variation and output voltage variation, indicating that, when the power-supply voltage variation occurs, as the PSRR ratio becomes higher, the degree of output voltage variation becomes lower. It can be said that a high PSRR value means high tolerance to the power supply noise.

However, if the PSRR value is raised, power consumption may increase.

DETAILED DESCRIPTION

According to one embodiment of a voltage regulator, feedback circuitry to generate a feedback voltage relative to an output voltage; and an amplifier to amplify a differential voltage between the feedback voltage and a reference voltage to generate the output voltage, wherein the amplifier has:

a first transistor to feed a current in accordance with the feedback voltage; and a second transistor to feed a current in accordance with the reference voltage, wherein the first transistor has a first gate to be applied with the feedback voltage, and the second transistor has a second gate to be applied with the reference voltage, and the voltage regulator further has a conductor disposed to face at least either one of the first and second gates, the conductor being set at a predetermined electric potential.

Hereinafter, embodiments will be explained with reference to the drawings. In the present specification and the accompanying drawings, for easy understanding and simplicity of drawings, the explanation and the drawings are made with part of the configuration being omitted, modified or simplified. However, the technical contents to the extent that a similar function can be expected will be interpreted to be included in the embodiments. Moreover, in the accompanying drawings of the present specification, for simplicity in drawings and easy understanding, the scale, the ratio of height to width, etc. may be modified to be exaggerated from those of actual ones, according to need.

Figure 1:
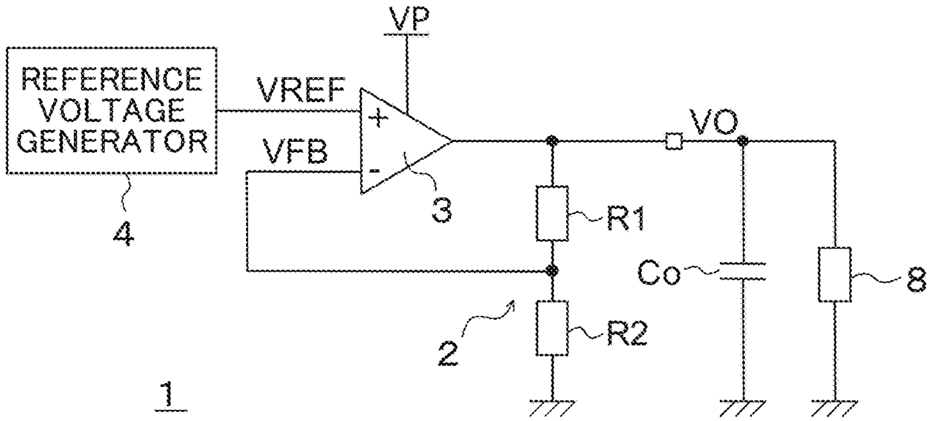
FIG. 1 is a block diagram of a voltage regulator according an embodiment of the present disclosure.

FIG. 1 is a block diagram of a voltage regulator 1 according an embodiment of the present disclosure. The voltage regulator 1 of FIG. 1 is provided with feedback circuitry 2 and an amplifier 3. The feedback circuitry 2 generates a feedback voltage VFB correlated with an output voltage VO. The amplifier 3 amplifies a differential voltage between the feedback voltage VFB and a reference voltage VREF to generate the output voltage VO. To the amplifier 3, a power supply voltage VP is supplied, which is however varied due to a noise caused by various factors. In the following, this noise is referred to as a power supply noise or a VP noise.

The voltage regulator 1 of FIG. 1 is also referred to as a linear regulator. The reference voltage VREF input to the amplifier 3 is generated by a reference voltage generator 4. The reference voltage generator 4 generates the reference voltage VREF, without depending on the power supply voltage VP. The voltage regulator 1 of FIG. 1 can be built in a semiconductor chip. In this case, the reference voltage generator 4 may also be built in the same semiconductor chip or another semiconductor chip (semiconductor device).

The feedback circuitry 2 generates the feedback voltage VFB, for example, by resistance voltage division of the output voltage VO. The amplifier 3 adjusts the output voltage VO so that the differential voltage between the feedback voltage VFB and the reference voltage VREF becomes zero. Therefore, in a stable state, the feedback voltage VFB is equal to the reference voltage VREF. Accordingly, the feedback voltage VFB is kept at a constant voltage level, which means that a constant current flows through a plurality of resistors R1 and R2 in the feedback circuitry 2, and only by this constant current, the output voltage VO is determined. Finally, the output voltage VO always has a constant ratio to the reference voltage VREF. An output capacitor Co is connected to a terminal (an output terminal, hereinafter) that outputs the output voltage VO so that the voltage regulator 1 of FIG. 1 can operate stably even if a load 8 varies.

As described above, since the output voltage VO is determined by the reference voltage VREF and a resistance voltage division ratio of the feedback circuitry 2, the output voltage VO does not vary ideally, even if the power supply voltage VP varies or a noise is superimposed on the power supply voltage VP. However, actually, a power supply noise affects the output voltage VO through some paths in the voltage regulator 1 of FIG. 1. For this reason, PSRR characteristics, which indicate how much the power supply noise can be reduced from the output voltage VO, are an important indicator.

Figure 2:
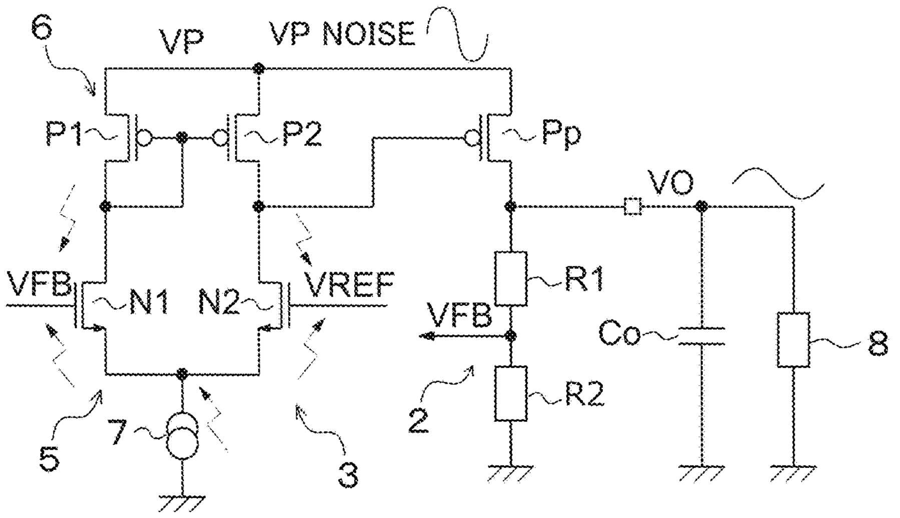
FIG. 2 is a circuit diagram of a specific example of the internal configuration of an amplifier of FIG. 1.

FIG. 2 is a circuit diagram showing a specific example of the internal configuration of the amplifier 3 of FIG. 1. The amplifier 3 of FIG. 2 has a differential amplifier 5 and an output transistor Pp which is an PMOS transistor. The differential amplifier 5 has a current mirror 6 having a pair of PMOS transistors (a first transistor and a second transistor) P1 and P2, a differential pair of NMOS transistors N1 and N2, and a constant current source 7.

The gates (a first gate and a second gate) of the PMOS transistors P1 and P2 are connected together, the sources thereof both being supplied with the power supply voltage VP. The gate and drain of the PMOS transistor P1 are connected to the drain of the NMOS transistor N1. The drain of the PMOS transistor P2 is connected to the drain of the NMOS transistor N2 and to the gate of the output transistor Pp. The gate of the NMOS transistor N1 is applied with the feedback voltage VFB. The gate of the NMOS transistor N2 is applied with the reference voltage VREF. The constant current source 7 is connected to the sources of the NMOS transistors N1 and N2.

The source of the output transistor Pp is applied with the power supply voltage VP, the drain thereof being connected to the feedback circuitry 2 and the output terminal. The feedback circuitry 2 has resistors R1 and R2 series-connected between the source of the output transistor Pp and a ground node. A voltage divided by the resistors R1 and R2 in resistance voltage division is the feedback voltage VFB which is fed back to the gate of the NMOS transistor N1. To the output terminal, the output capacitor Co and the load 8 are connected.

Subsequently, first to third paths through which the power supply noise propagates, inside the voltage regulator 1 of FIG. 2, will be explained.

The first path is a path through which the power supply noise propagates to the drains of the PMOS transistors P1 and P2. While the amplifier 3 is performing a feedback operation, the gate voltages of the NMOS transistors N1 and N2 are the same as each other and the gate-to-source voltages of the NMOS transistors N1 and N2 are also the same as each other. Therefore, the drain-to-source currents of the NMOS transistors N1 and N2 are equal to each other. The drain-to-source currents are supplied from the PMOS transistors P1 and P2 that are an active load 8, so that the drain-to-source currents of the PMOS transistors P1 and P2 also become equal to each other. Since, the gate of the PMOS transistor P1 is connected to the drain thereof, the gate voltage of the PMOS transistor P1 is adjusted so that the drain-to-source currents of the PMOS transistors P1 and P2 become equal to each other.

It is required to make constant the gate-to-source voltage of a MOSFET in order to feed a constant drain-to-source current to the MOSFET. However, when the power supply voltage VP applied to the source of the PMOS transistor P1 varies, the gate voltage of the PMOS transistor P1 also varies to follow the variation of the power supply voltage VP. Since, the drain of the PMOS transistor P1 is connected to the gate thereof, the variation of the power supply voltage VP propagates to the drain of the PMOS transistor P1. Moreover, since the drain of the PMOS transistor P1 is connected to the drain of the NMOS transistor N1, the gate voltage of the NMOS transistor N1 varies via gate-to-drain parasitic capacitance of the NMOS transistor N1. To the gate of the NMOS transistor N1, the feedback voltage VFB is applied, which is generated by resistance voltage division of the output voltage VO by the resistors R1 and R2 in the feedback circuitry 2. Therefore, when the feedback voltage VFB varies, the output voltage VO varies. As explained above, the output voltage VO varies due to the propagation of the power supply noise to the drains of the PMOS transistors P1 and P2.

The second path is a path through which the power supply noise propagates to the gate of the output transistor Pp. A linear regulator such as the voltage regulator 1 of FIG. 2 operates to output an constant voltage even if the power supply voltage VP varies. When the load 8 is constant, even if the power supply voltage VP varies, the output transistor Pp continuously outputs a constant output current to the load 8. In order to feed a constant current, in the same manner as the NMOS transistor N1, it is required to keep the gate-to-source voltage of the output transistor Pp at a constant level. The gate of the output transistor Pp is connected to the drain of the PMOS transistor P2. The drain voltage of the PMOS transistor P2 varies to follow the power supply noise, as described above. Therefore, the gate voltage of the output transistor Pp also varies to follow the power supply noise. Since the gate of the output transistor Pp is also connected to the drain of the NMOS transistor N2, the power supply noise propagates to the gate of the NMOS transistor N2 via drain-to-gate parasitic capacitance of the NMOS transistor N2. To the gate of the NMOS transistor N2, the reference voltage VREF is applied, which varies when the power supply noise propagates to the gate of the NMOS transistor N2. The voltage regulator 1 of FIG. 2 generates the output voltage VO so that the feedback voltage VFB becomes equal to the reference voltage VREF. Therefore, when the power supply noise propagates to the reference voltage VREF, the power supply noise also propagates to the output voltage VO, so that the output voltage VO varies due to the effect of the power supply noise.

The third path is a path through which the power supply noise propagates to the constant current source 7. When the power supply noise propagates to the constant current source 7, the power supply noise propagates to the gates of the NMOS transistors N1 and N2 via source-to-gate parasitic capacitance of the NMOS transistors N1 and N2. Accordingly, in the same manner as the propagation of the power supply noise through the second path, the power supply noise finally propagates to the output voltage VO.

Figure 3:
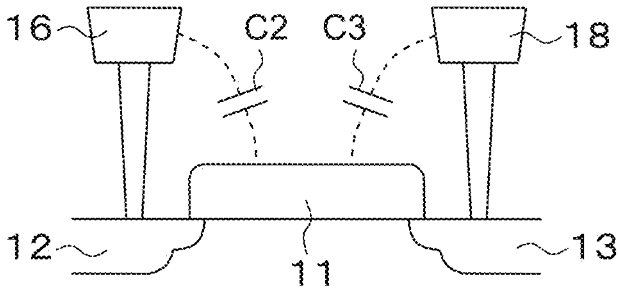
FIG. 3 is a figure schematically showing gate-to-drain parasitic capacitance and gate-to-source parasitic capacitance in a general MOSFET.

FIG. 3 is a figure schematically showing parasitic capacitance C2 between a gate 11 and a drain 12 (precisely, a drain wiring 16), and parasitic capacitance C3 between the gate 11 and a source 13 (precisely, a source wiring 18), in a general MOSFET. The parasitic capacitance C2 and C3 are in inverse proportion to the distance between the gate 11 and the drain 12 (source 13) and in proportion to the electrode area.

Figure 4:
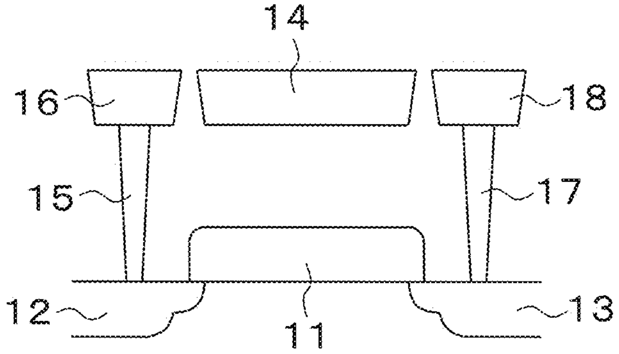
FIG. 4 is a schematic sectional view showing an example in which a shield wiring (conductor) 14 is disposed to above at least either one of NMOS transistors N1 and N2 of FIG. 2.

FIG. 4 is a schematic sectional view showing an example in which a shield wiring (conductor) 14 is disposed to face at least either one of the NMOS transistors N1 and N2 of FIG. 2. For example, the shield wiring 14 is disposed above at least either one of the NMOS transistors N1 and N2. The shield wiring 14 of FIG. 4 is disposed between a drain wiring 16 connected to a drain 12 via a contact 15 and a source wiring 18 connected to a source 13 via a contact 17. The shield wiring 14 is set at a predetermined electric potential by a not-shown contact. For example, the shield wiring 14 is conductive with a ground node. The shield wiring 14 is a conductor having impedance at the same level as or a lower level than the drain (source) wiring and gate. When such a shield wiring 14 is provided, the power supply noise superimposed on the drain, source and gate tends to propagate to the shield wiring 14. As a result, the power supply noises propagating between the gate and drain, and between the gate and source, via the parasitic capacitance C2 and C3, can be restricted. Therefore, by providing the shield wiring 14, the power supply noise hardly propagates to the output voltage VO. As described, the shield wiring 14 is electrically insulated against the gates of the NMOS transistors N1 and N2.

It is desirable in production to form the shield wiring 14 of FIG. 4 at the same layer and with the same conductive material as a drain wiring layer 16 and a source wiring layer 18. This is because, the shield wiring 14 can be formed in the same production process as the drain wiring layer 16 and the source wiring layer 18. It is desirable to widen the area of the shield wiring 14 as much as possible to reduce impedance. However, as the area of the shield wiring 14 is made larger, the parasitic capacitance between the gate and the shield wiring 14 increases. Therefore, it is desirable to dispose the shield wiring 14 having a size with the same width as the gate width (a gate length in the orthogonal direction to the surface of the drawing sheet of FIG. 4) of the gate and with the same length as the gate length (a gate width in the lateral direction in the drawing sheet of FIG. 4) of the gate, with which the shield wiring 14 can completely cover the gate when viewed from above.

Figure 5:
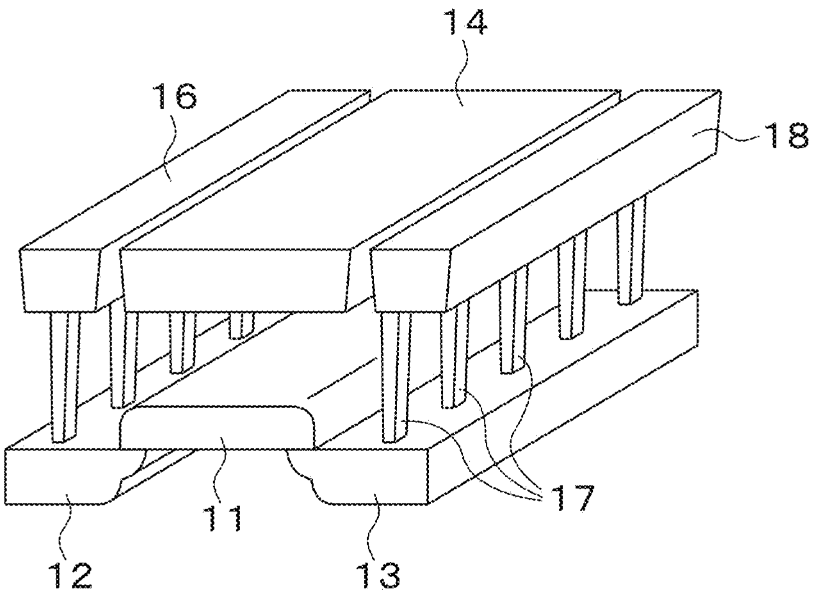
FIG. 5 is a perspective view schematically showing the shield wiring 14 and the peripheral configuration of FIG. 4.

FIG. 5 is a perspective view schematically showing the shield wiring 14 and the peripheral configuration of FIG. 4. As shown in FIG. 5, the shield wiring 14 is disposed in the same layer as the drain wiring layer 16 and the source wiring layer 18, to cover the gate entirely from above.

Figure 6:
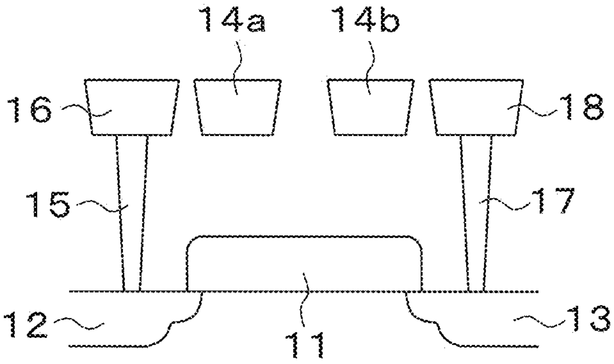
FIG. 6 is a sectional view showing a modification of the configuration of FIG. 4.

FIG. 6 is a sectional view showing a modification of the configuration of FIG. 4. In FIG. 6, two shield wirings 14 (a first shield wiring 14*a* and a second shield wiring 14*b*) are provided. Both of the first shield wiring (first conductor) 14*a* and the second shield wiring (second conductor) 14*b* are disposed above the gate 11 to face the gate 11. Both of the first shield wiring 14*a* and the second shield wiring 14*b* are connected to a ground node by a not-shown contact.

The first and second shield wirings 14*a* and 14*b* are arranged separated from each other in the same layer as the drain and source wiring layers 16 and 18. The first shield wiring 14*a* is disposed in the vicinity of the drain wiring layer 16 whereas the second shield wiring 14*b* is disposed in the vicinity of the source wiring layer 18. As described, the shield wiring 14 is divided into a plurality of wirings which are arranged between the drain and source wiring layers 16 and 18.

As shown in FIG. 6, by separating the shield wiring 14 into two, the parasitic capacitance between the gate 11 and the shield wiring 14 can be reduced compared to the configuration of FIG. 4. Therefore, it is desirable to adopt the configuration of FIG. 6 in the case where the parasitic capacitance between the gate 11 and the shield wiring 14 is problematic. In the case of the configuration of FIG. 6, the gate-to-drain parasitic capacitance C2 and the gate-to-source parasitic capacitance C3 can be reduced while the total area of the shield wiring 14 made of the first and second shield wirings 14*a* and 14*b* is reduced, and hence the power supply noise hardly propagates to the gate, drain and source, so that the change in output voltage VO can be prevented.

Figure 7:
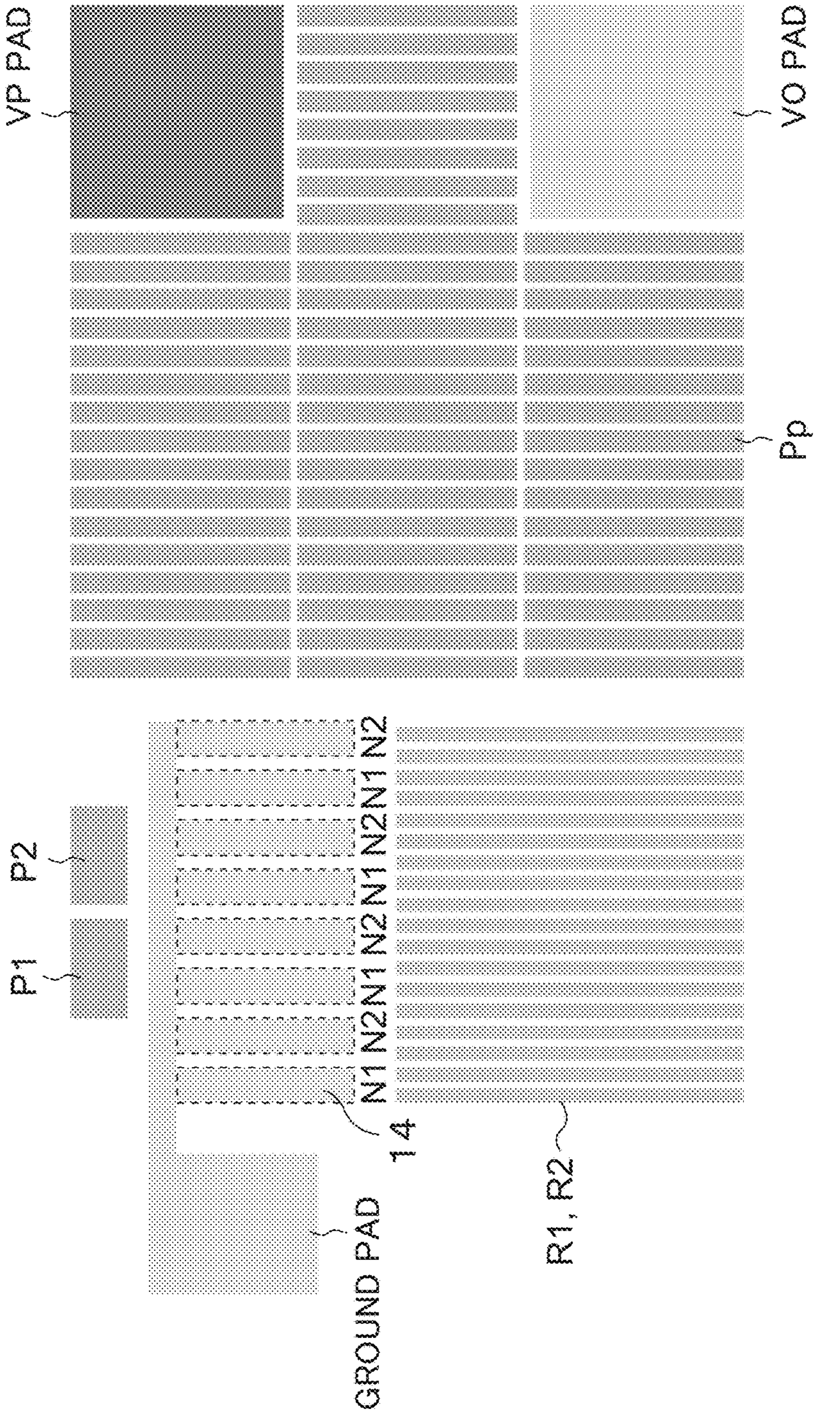
FIG. 7 is a layout view showing an example of the layout of the voltage regulator 1 of FIG. 2.

FIG. 7 is a layout view showing an example of the layout of the voltage regulator 1 of FIG. 2. The layout view of FIG. 7 shows an example in which a plural number of the gates of the differential pair of NMOS transistor N1 and N2 of FIG. 2 are alternately arranged. In FIG. 7, although the gates of the NMOS transistor N1 and N2 are shown, the sources and drains thereof are omitted. In FIG. 7, a comb-like shield wiring 14 connected to a ground pad is disposed above the gates of the NMOS transistor N1 and N2. The shield wiring 14 is disposed to cover the area of the gates entirely in the gate longitudinal and width directions.

Moreover, in FIG. 7, having the arrangement area of the NMOS transistors N1 and N2 in the amplifier 3 interposed between two sides, the PMOS transistors P1 and P2 are arranged on one side and the resistors R1 and R2 in the feedback circuitry 2 are formed in a plurality of patterns on the other side. On the right side of the arrangement area of the amplifier 3 and the feedback circuitry 2, the gate of the output transistor Pp is formed in a plurality of patterns. In the vicinity of the patterns, a pad for the power supply voltage VP and a pad for the output voltage VO are provided. FIG. 7 shows an example of the layout of the voltage regulator 1, a variety of modifications being considered.

Figure 8:
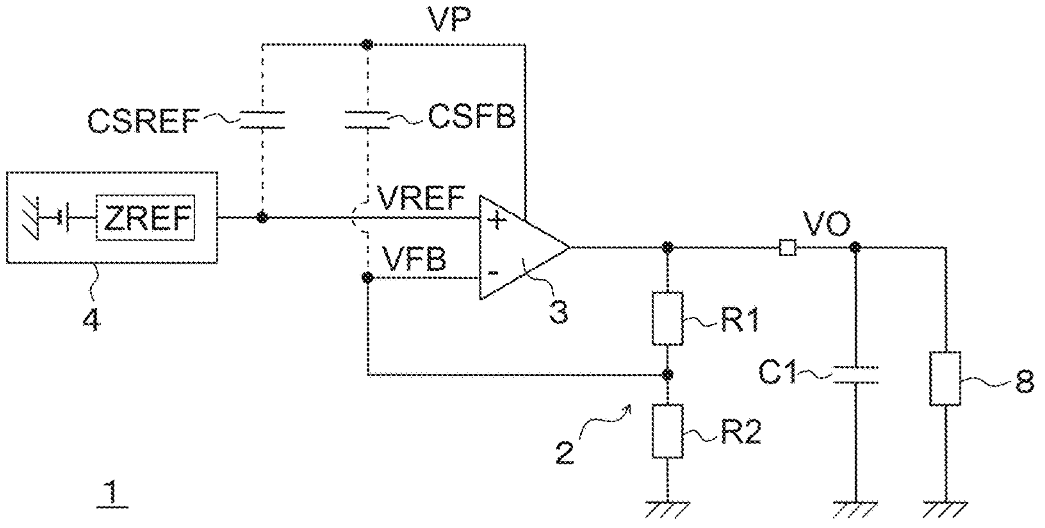
FIG. 8 is a block diagram of the voltage regulator 1 of FIG. 1, taking parasitic capacitance in respective parts of the voltage regulator 1 into consideration.

FIG. 8 is a block diagram of the voltage regulator 1 of FIG. 1, taking parasitic capacitance in respective parts of the voltage regulator 1 into consideration. Impedance ZREF is present at the output node of the reference voltage generator 4. Parasitic capacitance CSFB is present between a power-supply voltage VP node and the gate of the NMOS transistor N1. Parasitic capacitance CSREF is present between the power-supply voltage VP node and the gate of the NMOS transistor N2. In the following, a D.C. component voltage of and an output node voltage of the reference voltage generator 4 are denoted as VDC and VREF, respectively.

A component VOREF that appears from the positive-input terminal side of the amplifier 3 to the output terminal thereof is expressed by the following expression (1).

$$\mathrm{VOREF}=(1+R2/R1)\times\mathrm{VREF} \tag{1}$$

$$\mathrm{VREF}=\{\mathrm{ZREF}/(\mathrm{ZREF}+1)/j\omega\mathrm{CSREF})\}\times VP+VDC \tag{2}$$

The following expression (3) is given by the above expressions (1) and (2).

$$\mathrm{VOREF}=(1+R2/R1)\times\{(\mathrm{ZREF}/(\mathrm{ZREF}+1/j\omega\mathrm{CSREF})\}\times VP+VDC \tag{3}$$

As the expression (3) indicates, the phase of VOREF advances by 90 degrees due to the propagation of power supply noise to the positive-input terminal of the amplifier 3 via the parasitic capacitance CSREF.

A feedback voltage VFB at the negative-input terminal of the amplifier 3 has the same waveform as the reference voltage VREF due to a virtual short-circuit effect of the amplifier 3, so that the power supply noise does not propagate theoretically. However, the power supply noise that has propagated to the parasitic capacitance CSFB propagates as a current via the resistor R2 in the feedback circuitry 2, so that the power supply noise from the negative-input terminal of the amplifier 3 is superimposed on the output voltage VO.

A component VOFB that appears from the negative-input terminal side of the amplifier 3 to the output terminal thereof is expressed by the following expression (4).

$$\mathrm{VOFB}=-R2/(1/j\omega\mathrm{CSFB})\times VP \tag{4}$$

The phase of VOFB is delayed by 90 degrees because VOFB is input to the negative-input terminal of the amplifier 3 via the parasitic capacitance CSFB. A voltage VFB at the negative-input terminal of the amplifier 3 has the same waveform as the reference voltage VREF due to the virtual short-circuit effect of the amplifier 3, so that the voltage VFB is not affected by the power supply noise theoretically. However, the power supply noise from the parasitic capacitance CSFB propagates as a current via the resistor R2, so that the power supply noise from the VFB-terminal side also propagates to the output terminal.

In practice, there is a noise generated by the amplifier 3 itself, however, this noise is not so related to the present disclosure, and hence ignored in the present embodiment.

The output voltage VO of the amplifier 3 is expressed by the following expression (5).

$$VO = \mathrm{VOREF}+\mathrm{VOFB} = (1+R2/R1)\times[\{\mathrm{ZREF}/(\mathrm{ZREF}+1/j\omega\mathrm{CSREF}\}\times VP + VDC] - R2/(1/j\omega\mathrm{CSFB})\times VP = (1+R2/R1)\times VDC + \{(1+R2/R1)\times\mathrm{ZREF}/(\mathrm{ZREF}+1/j\omega\mathrm{CSREF}) - R2/(1/j\omega\mathrm{CSFB})\}\times VP \quad (5)$$

In the expression (5), the terms related to the power supply voltage VP are expressed by the following expression (6).

$$\{(1+R2/R1)\times\mathrm{ZREF}/(\mathrm{ZREF}+1/j\omega\mathrm{CSREF}) - R2/(1/j\omega\mathrm{CSFB})\}\times VP \quad (6)$$

When the expression (6) becomes zero, the output VO of the amplifier 3 does not depend on the power supply voltage VP, so that the output VO is not affected by the power supply noise, hence giving excellent PSRR characteristics.

One possible method of making the expression (6) become zero is to make smaller the values of the impedance ZREF, and the resistors R1 and R2 as much as possible. However, as the values of the impedance ZREF and the resistors R1 and R2 are made smaller, the circuit area, consumption current, start-up inrush current, input referred noise, etc. are increased, and hence undesirable.

For the reason above, in the present embodiment, as shown in FIGS. 4 to 6, the shield wiring 14 is provided to make at least either one of the parasitic capacitance CSREF and CSFB smaller so that the above expression (6) is close to zero. Since, the parasitic capacitance CSREF and CSFB are not intentionally added to improve the linear-regulator characteristics, the decrease in parasitic capacitance CSREF and CSFB is not usually problematic.

Figure 9:
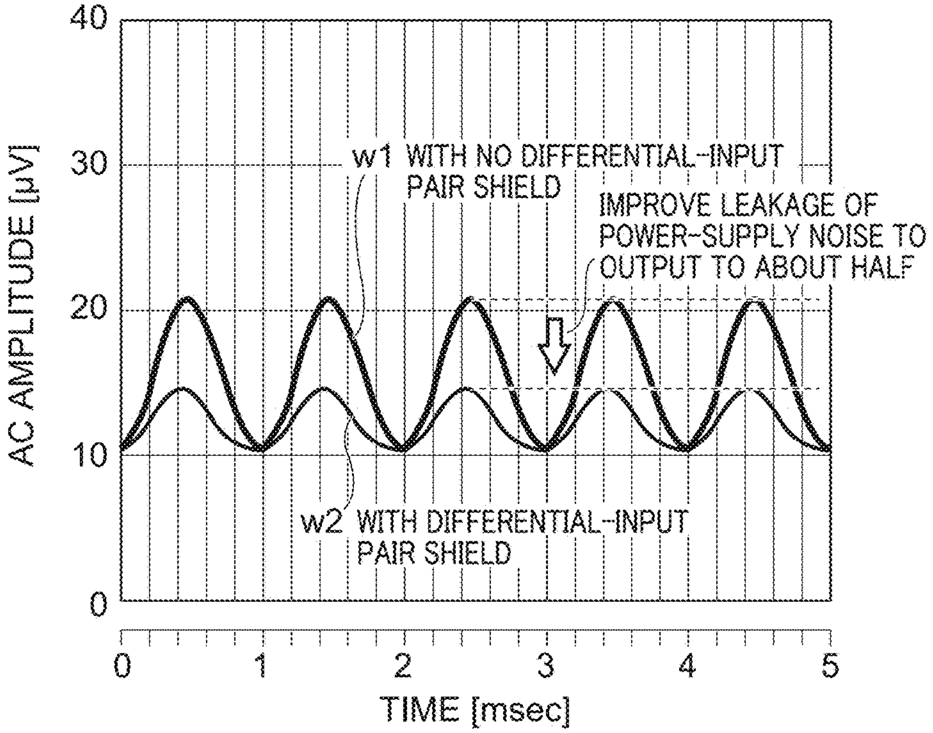
FIG. 9 is a waveform diagram of A. C. components included in an output voltage VO in comparison of the cases where the shield wiring 14 of FIGS. 4 to 6 is provided and not provided.

FIG. 9 is a waveform diagram of A. C. components included in the output voltage VO in comparison of the cases where the shield wiring 14 of FIGS. 4 to 6 is provided and not provided. In FIG. 9, the abscissa is time [msec] and the ordinate is A. C. amplitude [μV]. In FIG. 9, a curve w1 and a curve w2 represent the cases of not providing and of providing the shield wiring 14, respectively. FIG. 9 shows the waveforms observed in the case, as an example, where a power supply noise of 0.5 Vp−p at a frequency of 1 kHz, the frequency being generally used in a linear regulator according to the PSRR specification, is applied to the power-supply voltage VP node of the voltage regulator 1 of FIG. 2. FIG. 9 shows that, having the shield wiring 14 not provided, the output voltage VO has a noise of about 10 μVp−p (curve w1), whereas, having the shield wiring 14 provided, the output voltage VO has a noise of about 5 μVp−p (curve w2) with a 50 percent reduction in noise component included in the output voltage VO (6 dB-improvement). The power supply rejection ratio of the power supply noise level, added with the shield wiring 14, is about 100 dB. When considering that the PSRR at 1 kHz of a general power supply is 60 dB to 90 dB, it can be said that the present embodiment achieves excellent PSRR characteristics, in view of the value of 100 dB.

Figure 10:
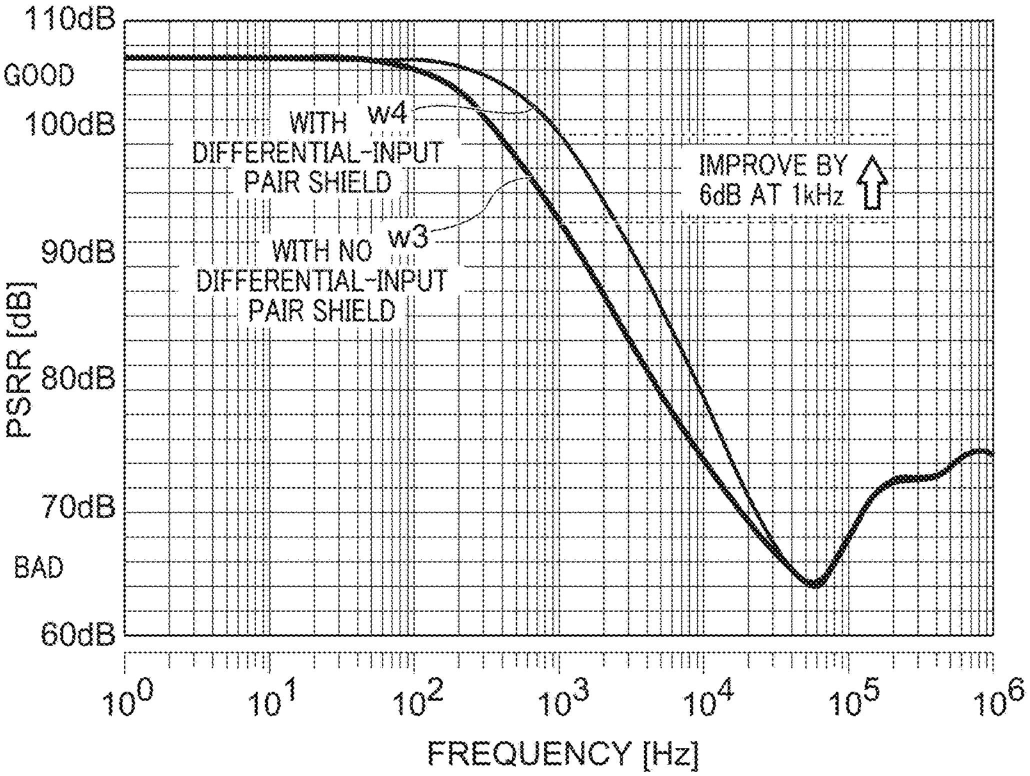
FIG. 10 is a figure showing PSRR (power supply noise rejection ratio) versus frequency.

FIG. 10 is a figure showing characteristic curves of the PSRR (power supply noise rejection ratio) versus frequency for examining the effect of power supply noise at frequencies other than 1 kHz. In FIG. 10, the abscissa is frequency [Hz] and the ordinate is PSRR [dB]. In FIG. 10, a curve w3 and a curve w4 represent the cases of not providing and of providing the shield wiring 14, respectively. As shown in FIG. 10, the PSRR improves over the entire frequency band in the case of providing the shield wiring 14. Especially, the PSRR significantly improves in a frequency band from 100 Hz to 10 kHz, which is common for the power supply noise of a linear regulator, in the case of providing the shield wiring 14.

The shield wiring 14 shown in FIGS. 4 to 6 may be provided to both of the NMOS transistors N1 and N2 that configure a differential pair or may be provided to either one of the NMOS transistors N1 and N2. For example, when the drain voltage of the NMOS transistor N2 of which the gate is applied with the reference voltage VREF fluctuates, it is impossible to correctly perform feed-back control. Therefore, the shield wiring 14 may be provided only immediately above the gate of the NMOS transistor N2.

As described above, in the present embodiment, since the shield wiring 14 connected to the ground node is disposed above the gates, it is achieved to reduce both of the gate-to-drain parasitic capacitance C2 and the gate-to-source parasitic capacitance C3 of at least either one of the NMOS transistors N1 and N2 that configure the differential pair. Moreover, by providing the above-described shield wiring 14, it is achieved to reduce the parasitic capacitance CSREF between the power-supply voltage VP node and the reference voltage VREF node, and the parasitic capacitance CSFB between the power-supply voltage VP node and the feedback voltage VFB node, to make the above-described expression (6) closer to zero, thereby improving the PSRR characteristics of the voltage regulator 1.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A voltage regulator comprising:

feedback circuitry to generate a feedback voltage relative to an output voltage; and an amplifier to amplify a differential voltage between the feedback voltage and a reference voltage to generate the output voltage, wherein the amplifier comprises:

a first transistor to feed a current in accordance with the feedback voltage; and a second transistor to feed a current in accordance with the reference voltage, wherein the first transistor comprises a first gate to be applied with the feedback voltage, and the second transistor comprises a second gate to be applied with the reference voltage, and the voltage regulator further comprising a conductor disposed to face at least either one of the first and second gates, the conductor being set at a predetermined electric potential, wherein the conductor is disposed above at least either one of the first and second gates so that at least either one of parasitic capacitance between a power-supply voltage node of the amplifier and a node of the reference voltage, and parasitic capacitance between the power-supply voltage node and a node of the feedback voltage, is reduced.

2. The voltage regulator of claim 1, wherein the conductor is disposed above at least either one of the first and second gates.

3. The voltage regulator of claim 1, wherein the conductor is disposed to cover at least either one of the first and second gates from above.

4. The voltage regulator of claim 1, wherein the conductor is electrically insulated against the first and second gates.

5. The voltage regulator of claim 1, wherein the predetermined electric potential is a ground potential.

6. The voltage regulator of claim 1, wherein at least one of the feedback circuitry and the amplifier is provided inside of or above a semiconductor substrate.

7. A voltage regulator comprising:

feedback circuitry to generate a feedback voltage relative to an output voltage; and an amplifier to amplify a differential voltage between the feedback voltage and a reference voltage to generate the output voltage, wherein the amplifier comprises:

a first transistor to feed a current in accordance with the feedback voltage; and a second transistor to feed a current in accordance with the reference voltage, wherein the first transistor comprises a first gate to be applied with the feedback voltage, the second transistor comprises a second gate to be applied with the reference voltage, the voltage regulator further comprising a conductor disposed to face at least either one of the first and second gates, the conductor being set at a predetermined electric potential, and the conductor is disposed at a same layer as a drain wiring layer of and a source wiring layer of at least either one of the first and second gates, and disposed between the drain and source wiring layers.

8. The voltage regulator of claim 7, wherein the conductor is divided into a plurality of conductors disposed between the drain and source wiring layers.

9. The voltage regulator of claim 8, wherein the conductor comprises:

a first conductor disposed at a same layer as the drain wiring layer and close to the drain wiring layer; and a second conductor disposed at a same layer as the first conductor and separated from the first conductor, and disposed at a same layer as the source wiring layer and close to the source wiring layer.

10. A voltage regulator comprising:

feedback circuitry to generate a feedback voltage relative to an output voltage; and an amplifier to amplify a differential voltage between the feedback voltage and a reference voltage to generate the output voltage, wherein the amplifier comprises:

a first transistor to feed a current in accordance with the feedback voltage; and a second transistor to feed a current in accordance with the reference voltage, wherein the first transistor comprises a first gate to be applied with the feedback voltage, the second transistor comprises a second gate to be applied with the reference voltage, the voltage regulator further comprising a conductor disposed to face at least either one of the first and second gates, the conductor being set at a predetermined electric potential, and the conductor is disposed orthogonal to and to overlap with an entire layout area of at least either one of the first and second gates in a gate longitudinal direction and in a gate width direction.

11. A voltage regulator comprising:

feedback circuitry to generate a feedback voltage relative to an output voltage; and an amplifier to amplify a differential voltage between the feedback voltage and a reference voltage to generate the output voltage, wherein the amplifier comprises:

a first transistor to feed a current in accordance with the feedback voltage; and a second transistor to feed a current in accordance with the reference voltage, wherein the first transistor comprises a first gate to be applied with the feedback voltage, the second transistor comprises a second gate to be applied with the reference voltage, the voltage regulator further comprising a conductor disposed to face at least either one of the first and second gates, the conductor being set at a predetermined electric potential so that power supply noise propagated to the output voltage is reduced.

* * * * *